United States Patent [19]

Yamazaki

[11] Patent Number: 4,603,600
[45] Date of Patent: Aug. 5, 1986

[54] PARKING BRAKE OPERATING DEVICE

[75] Inventor: Takeo Yamazaki, Anjo, Japan

[73] Assignee: Aisin Seiki Kabushiki Kaisha, Japan

[21] Appl. No.: 691,770

[22] Filed: Jan. 16, 1985

[30] Foreign Application Priority Data

Feb. 17, 1984 [JP] Japan ............................ 59-21857[U]

[51] Int. Cl.$^4$ ............................................... G05G 5/06
[52] U.S. Cl. ........................................ 74/503; 74/540; 74/543
[58] Field of Search .......................... 74/503, 540, 543

[56] References Cited

U.S. PATENT DOCUMENTS

| 2,666,339 | 1/1954 | Schwarz | 74/503 |
| 2,811,869 | 11/1957 | Hinsey | 74/503 X |
| 4,240,307 | 12/1980 | Yamazaki | 74/503 |

Primary Examiner—Harold W. Weakley
Attorney, Agent, or Firm—Finnegan, Henderson, Farabow, Garrett & Dunner

[57] ABSTRACT

A parking brake operating device in which a member having two cams and spring are disposed outside a handle by coaxially securing a sleeve to one end of a plunger, and by providing in the handle a shaft member for insertion into the sleeve as to be supported, cam surfaces on the expanding portion at the end of the shaft member and at the opposite position on the end surface on the handle side of the sleeve, and in the sleeve a spring for pressing these cam surfaces.

This structure enables a rotatable connection of the handle with the plunger only when the handle is pulled such that actuation of the parking brake is maintained even when the handle is turned when mistakenly touched by the hands or legs while the parking brake is actuated.

11 Claims, 10 Drawing Figures

PARKING BRAKE OPERATING DEVICE

BACKGROUND OF THE INVENTION

This invention relates to a parking brake operating device for an automobile, and more particularly, to improvements of an automotive parking brake operating device in which the actuation of the parking brake is maintained even when the handle is turned when mistakenly touched by hands or legs.

FIG. 1 shows this kind of device according to the prior art as is disclosed in Japanese Utility Model Laid-Open No. 155960/1981. In this device, a cam surface 4a is provided on the expanding portion at the end of a rod 4 which is secured to a plunger 2 with a pin 3 such as to project coaxially from one end of the plunger 2, and a cam surface 5a is provided on a cylinder 5 which is fitted on a small diameter portion of the rod 4. This cylinder 5 is fixed by welding or the like on a fixed plate 7 which is secured to a handle 1 with screws. A compression spring 8 is inserted between the cylinder 5 and the end of the plunger 2 such as to press both cam surfaces 4a and 5a.

However, this device has a problem. That is, since all of the rod 4, cylinder 5, spring 8, and so forth are housed in the handle 1, the size of the rod 4 and the cylinder 5 have an influence on the size of the handle 1. Therefore, if the handle 1 is designed to have the necessary tensile strength without a special high-strength material, it will become too large in size for practical use.

SUMMARY OF THE INVENTION

Accordingly, it is an object of the invention to solve the above problem and to provide an automotive parking brake operating device in which a handle is designed to have the necessary tensile strength without using a special high-strength material while keeping the size of the handle small enough for practical use.

To this end, this invention provides a structure in which members having two cams and spring are disposed outside the handle by coaxially securing a sleeve to one end of the plunger, and by providing in the handle a shaft member for inserting into the sleeve so as to be supported, cam surfaces on the expending portion at the end of the shaft member and at the opposite position of the end surface on the handle side of the sleeve, and in the sleeve a spring for pressing these cam surfaces.

It is another object of the invention to provide an automotive parking brake operating device in which the actuation of the parking brake is maintained even when the handle is turned when mistakenly touched by the hands or legs while the parking brake is actuated.

To this end, the parking brake operating device according to this invention comprises: a plunger mounted on a car body such as to be slidable in the axial direction thereof and rotatable around the axis thereof; a handle attached to one end of the plunger such as to be slidable in the axial direction of the plunger and rotatable around the axis; a parking brake actuating cable which is connected to the other end of the plunger directly or through a lever or the like such that a parking brake will be actuated when a driver pulls the plunger by pulling the handle; a locking mechanism which inhibits the plunger from returning due to a reaction force of the brake when the plunger is pulled by the driver and which releases the inhibition by a rotation of the plunger; a ring cam surface facing in the direction opposite to the handle pulling force provided on the plunger; a ring cam surface corresponding to the cam surface provided on the handle; and a spring retaining the handle at a predetermined angular position in relation to the plunger by pressing these cam surfaces, thereby to connect the handle with the plunger for unitary rotation only when the handle is pulled such that the actuation of the parking brake is maintained even when a handle is turned by being mistakenly touched by hands or legs while the parking brake is being actuated.

BRIEF DESCRIPTION OF THE DRAWINGS

These and other objects as well as advantages of the present invention will become clear by the following description of preferred embodiments of the present invention with reference to the accompanying drawings, wherein.

DETAILED DESCRIPTION OF THE PREFERRED EMBODIMENTS

Now, a first embodiment will be explained referring to FIGS. 2 to 5.

Figure 1:
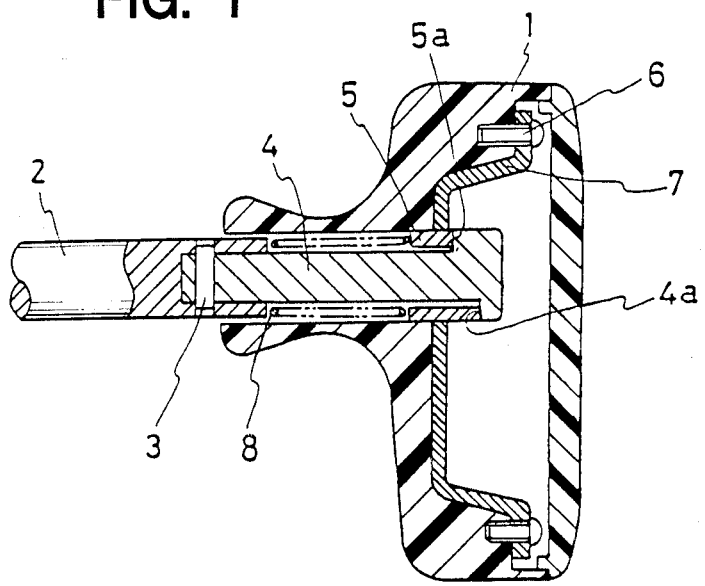
FIG. 1 shows a conventional device.
Figure 3:
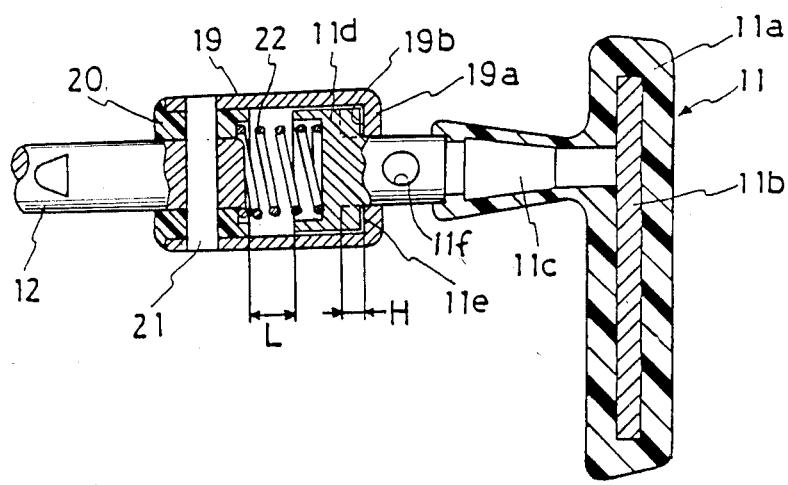
FIG. 3 is an expanded sectional view taken along the line III—III of FIG. 2.
Figure 2:
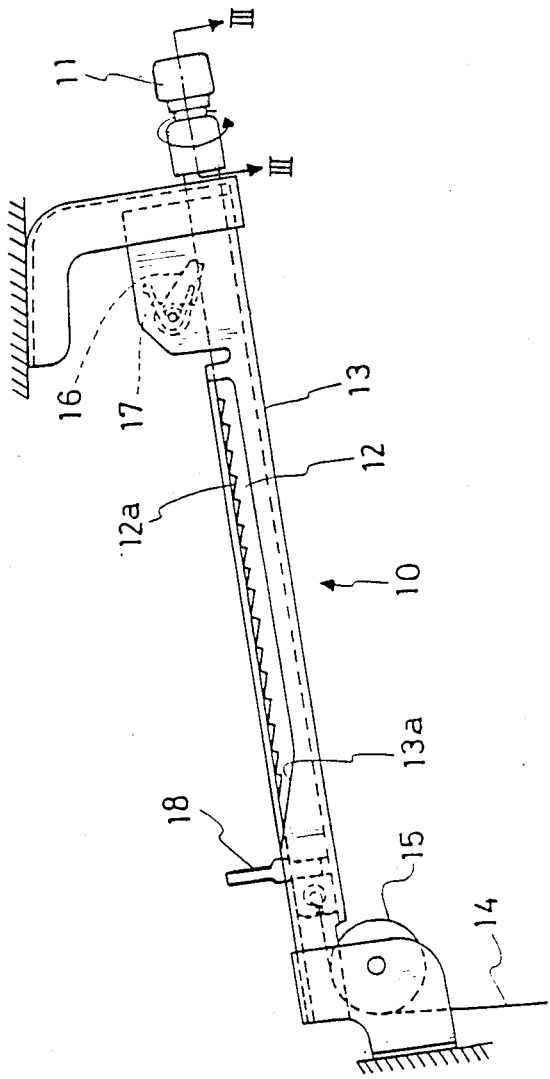
FIG. 2 shows a first embodiment of the invention.
Figure 4:
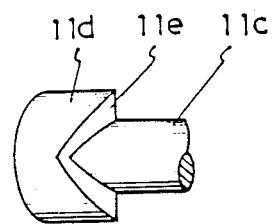
FIG. 4 is a perspective view of a part of the shaft member of the handle shown in FIG. 3.
Figure 5A:
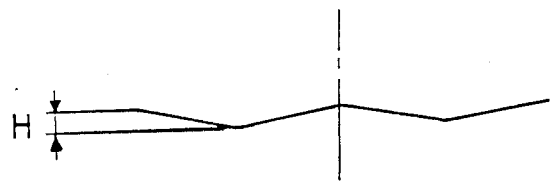
FIG. 5A shows the axial changes of the outer diameter of the cam surface shown in FIG. 4 with a line.
Figure 5B:
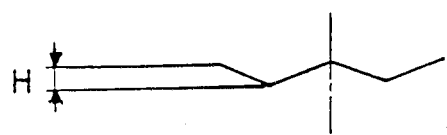
FIG. 5B shows the axial changes of inner diameter of the cam surface shown in FIG. 4 with a line.

In FIG. 2, a parking brake operating device 10 has a plunger 12 with a handle 11 attached to one end thereof, and this plunger 12 is supported by a support 13 fixed to a car body such as to be slidable in the axial direction and rotatable around the axis thereof. To the other end of the plunger 12 one end of a parking brake actuating cable 14 wound on a roller 15 which is mounted to the support 13 is connected such as to actuate the parking brake when a driver pulls the plunger 12 in the rightward direction in FIG. 2. As a locking mechanism for inhibiting the plunger from being returned due to the reaction force of the brake, a ratchet 12a with teeth arranged in parallel is provided on the surface of the plunger 12 in the axial direction, and a pawl 16 corresponding to the ratchet 12a is rotatably supported by the support 13. The pawl 16 is urged by a spring 17 such as to make contact with the surface of the plunger 12. When the plunger 12 is pulled in the rightward direction in FIG. 2, the pawl 16 engages the ratchet 12a so as to inhibit the plunger 12 from being returned, whereby the actuation of the parking brake is maintained. The engagement of the pawl 16 with the ratchet 12a is released by rotating the plunger 12 in the direction shown by the arrow in FIG. 2 and the parking brake is disengaged by returning the plunger 12 according to the pull-back action of the plunger 12 due to the reaction force of the brake while the plunger 12 is in the totated state. When the plunger 12 is restored approximately to the original position for releasing the parking brake, a pin 18 which is fixed on the plunger 12 engages the cam surface 13a of the support 13, whereby the plunger 12 is restored to the normal angular position at which the ratchet 12a is opposed to the pawl 16.

The handle 11 consists of a grip portion 11a made of synthetic resin, a core bar or plate 11b in the grip portion 11a and a shaft member 11c welded to the core bar 11b. The shaft member 11c of the handle 11 extends into a sleeve 19 which is coaxially fixed on one end of the plunger 12 while penetrating the end wall 19a of the sleeve 19 such as to be slidable in the axial direction and rotatable around the axis, and at the end of the shaft member 11c an expanded portion 11d is provided which is supported by the peripheral wall of the sleeve 19 such as to be slidable in the axial direction and rotatable around the axis. The sleeve 19 is fitted to one end of the plunger 12 through a protector 20 made of synthetic resin and fixed on the plunger 12 together with the protector 20 by a pin 21. Ring cam surfaces 19b and 11e are provided inside the end wall 19a of the sleeve 19 and at the expanded portion 11d of the shaft member 11c, and a compression spring 22 for pressing these cam surfaces 19b, 11e is disposed between the protector 20 and the shaft member 11c in the sleeve 19. The cam surfaces 11e, 19b which are surfaces vertical to the axis and have a W-like configuration in exploded view are pressed by the spring 22 in the ordinary state, such that the handle 11 is retained at a predetermined angular position at which the cam surfaces 11e and 19b keep in contact with each other over the entire periphery thereof, in resistance to the turning force of the handle due to its tare or vibration during running of the car.

The value of torque which produces slip between both cam surfaces 11e, 19b in resistance to the spring 22 is set to be smaller than the value of torque which is to be added to the plunger 12 such as to release the engagement of the pawl 16 and the ratchet 12a at the release of the parking brake, and the gap L in the axial direction between the shaft member 11c and the protector 20 is set to be larger than the dimension in the axial direction H of cam surfaces 11e and 19b. This maintains the actuation of the parking brake even when turning force is applied to the handle 11 when mistakenly touched by the hands or legs while the parking brake is being actuated, because the handle 11 is rotated but not the plunger 11. When a driver pulls the handle 11 so as to actuate the parking brake, the handle pulling force is transmitted to the plunger 12 through the shaft member 11c, sleeve 19 and the pin 21, and no relative displacement in the axial direction between the handle 11 and the plunger 12 is produced. In order to release the parking brake, the handle 11 is pulled and rotated. When the handle 11 is pulled, the plunger 12 is also pulled, thereby to release the pressed contact of the pawl 16 and the ratchet 12a. Therefore, the value of touque which is to be applied to the plunger 12 for the purpose of releasing the engagement of the pawl 16 and the ratchet 12a becomes smaller and both cam surface 11e, 19b are pressed by the handle pulling force firmly enough not to slip with the reduced value of torque. Thus, the plunger 12 is unitary rotated with the handle 11, whereby the engagement of the pawl 16 and the ratchet 12a is released. The core bar 11c, the sleeve 19 and the pin 21 are made of steel products. On the shaft member 11c is provided a bore 11f through which the shaft member 11c is to be supported by a welding machine or a molding machine for supporting, when the shaft member 11c is welded to th core bar 11b in combination with the sleeve 19, or when the grip portion 11a is molded after the shaft member 11c is welded to the core bar 11b. Incidentally, the configuration of the cam surfaces is not limited to a W-like configuration in exploded view but may be, for example, a V-like configuration in exploded view.

Figure 6:
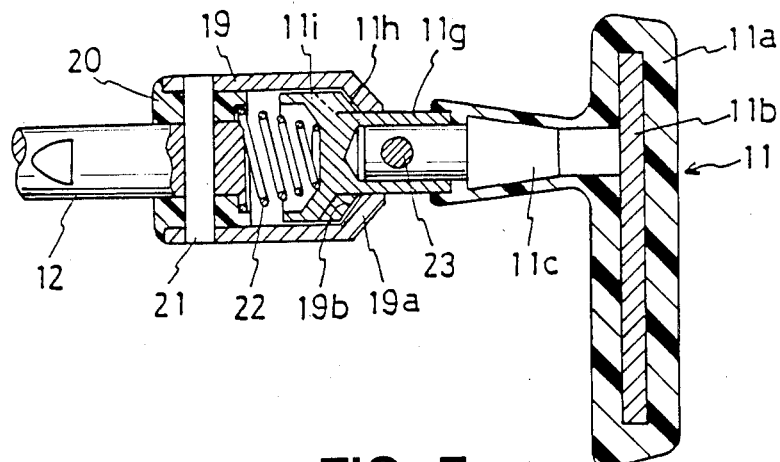
FIG. 6 is a sectional view of a second embodiment of the invention.

In a second embodiment shown in FIG. 6, a shaft member 11c of a handle 11 is made shorter than that in the first embodiment. A second shaft member 11g is fitted and secured by a pin 23 to the end portion of the shaft member 11c. On the second shaft member 11g an expanded portion 11i and a cam surface 11h are provided, and the end wall 19a of a sleeve 19 and cam surfaces 19b, 11h are tapered.

Figure 7:
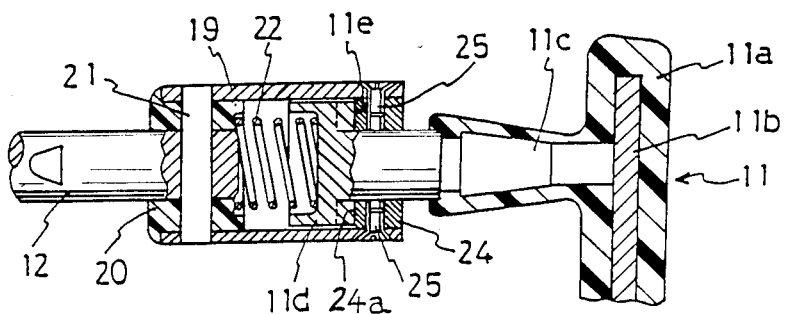
FIG. 7 is a sectional view of a third embodiment of the invention.

Referring to a third embodiment shown in FIG. 7, in place of an end wall on the handle side, an end wall member 24 is inserted into a sleeve 19 and fitted thereon with a screw 25, and on the end wall member 24 cam surface 24a is provided.

Figures 8, 9:
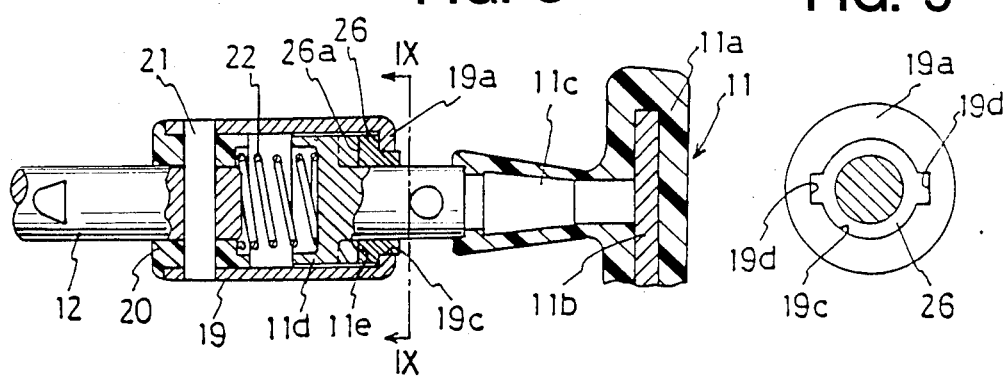
FIG. 8 is a sectional view of a fourth embodiment of the invention.
FIG. 9 is a sectional view taken along the line IX—IX of FIG. 8.

FIGS. 8, 9 show a fourth embodiment of which is larger than a shaft member 11c and a notch 19d are provided on the end wall 19a of the sleeve 19. A cam surface 26a is provided on a member 26 which is mounted on a sleeve 19 and which has a portion for fitting into the bore 19c and notch 19d.

While there have been described what are at present considered to be preferred embodiments of the invention, it will be understood that various modifications may be made therein, and it is intended that the appended claims cover all such modifications as fall within the true spirit and scope of the invention.

What is claimed is:

1. A parking brake operating device comprising: a plunger mounted on a car body such as to be slidable in the axial direction thereof and rotatable around the axis thereof; a handle attached to one end of said plunger such as to be slidable in the axial direction of said plunger and rotatable around the axis of said plunger; a parking brake actuating cable which is connected to the other end of said plunger such that a parking brake will be actuated when a driver pulls said plunger in the act of pulling said handle; a locking mechanism which inhibits said plunger from returning due to a reaction force of said brake when said plunger is pulled by said driver and which releases said inhibition by a rotation of said plunger; a ring cam surface facing in the direction opposite to the handle pulling force provided on said plunger; a ring cam surface corresponding to said cam surface provided on said handle; a spring for retaining said handle at a predetermined angular position in relation to said plunger by pressing said cam surfaces, thereby to connect said handle with said plunger for unitary rotation only when said handle is pulled; a sleeve coaxially fixed on said one end of plunger; and a shaft member provided on said handle for inserting into said sleeve so as to be supported; said cam surfaces being provided on an expanded portion at the end of said shaft member and at the opposite position of the end surface on the handle side of said sleeve and said spring being disposed in said sleeve.

2. A parking brake operating device according to claim 1, wherein said end wall on the handle side of said sleeve is integrally formed with said sleeve; the inner diameter of said sleeve is larger than the outer diameter of said plunger; a cylindrical protector is disposed between the outer diameter of one end of said plunger and the inner diameter of said sleeve; and said plunger, sleeve and protector are connected with a pin penetrating the same in the diametrical direction of said plunger.

3. A parking brake operating device according to claim 2, wherein said handle is composed of said shaft member, a core bar which is fixed substantially vertically to said shaft member and a grip portion which surrounds the whole periphery of said care bar and the portion on the core bar side of said shaft member; and said cam surfaces are formed directly on said end wall on the handle side of said sleeve and said expanded portion of said shaft member.

4. A parking brake operating device according to claim 1, wherein said end wall on the handle side of said sleeve is integrally formed with said sleeve; the inner diameter of said sleeve is larger than the outer diameter of said plunger; a cylindrical protector is disposed between the outer diameter of one end of said plunger and the inner diameter of said sleeve; said plunger, sleeve and protector are connected with a pin penetrating the same in the diametrical direction of said plunger; said spring is disposed between said protector and said expanded portion of said shaft member of said handle; said handle is composed of said shaft member, a core bar which is fixed substantially vertically to said shaft member and a grip portion which surrounds the whole periphery of said core bar and the portion on the core bar side of said shaft member; said cam surfaces are formed directly on said end wall on the handle side of said sleeve and said expanded portion of said shaft member; and said cam surfaces are formed vertically to the axis of said plunger and said shaft member.

5. A parking brake operating device according to claim 1, wherein said end wall on the handle side of said sleeve is integrally formed with said sleeve; the inner diameter of said sleeve is larger than the outer diameter of said plunger; a cylindrical protector is disposed between the outer diameter of one end of said plunger and the inner diameter of said sleeve; said plunger, sleeve and protector are connected with a pin penetrating the same in the diametrical direction of said plunger; said handle is composed of said shaft member, a core bar which is fixed substantially vertically to said shaft member and a grip portion which surrounds the whole periphery of said core bar and the portion on the core bar side of said shaft member; said cam surfaces are formed directly on said end wall on the handle side of said sleeve and said expanded portion of said shaft member; and said cam surfaces are formed obliquely to the axis of said plunger and said shaft member in axial section.

6. A parking brake operating device according to claim 1, wherein said end wall on the handle side of said sleeve is formed separately from said sleeve and connected with said sleeve by a connecting member; the inner diameter of said sleeve is larger than the outer diameter of said plunger; a cylyndrical protector is disposed between the outer diameter of one end of said plunger and the inner diameter of said sleeve; and plunger, sleeve and protector are connected with a pin penetrating the same in the diametrial direction of said plunger.

7. A parking brake operating device according to claim 6, wherein said handle is composed of said shaft member, a core bar which is fixed substantially vertically to said shaft member and a grip portion which surrounds the whole periphery of said core bar and the portion on the core bar side of said shat member; and said cam surfaces are formed on said end wall on the handle side of said sleeve and said expanded portion of said shaft member.

8. A parking brake operating device according to claim 1, wherein said end wall on the handle side of said sleeve is formed separately from said sleeve and connected with said sleeve by a connecting member; the inner diameter of said sleeve is larger than the outer diameter of said plunger; cylindrical protector is disposed between the outer diameter of one end of said plunger and the inner diameter of said sleeve; said plunger, sleeve and protector are connected with a pin penetrating the same in the diametricl direction of said plunger; said handle is composed of said shaft member, a core bar which is fixed substantially vertically to said shaft member and a grip portion which surrounds the whole periphery of said core bar and the portion on the core bar side of said shaft member; and said cam surfaces are formed on said end wall on the handle side of said sleeve and said expanded portion of said shaft member.

9. A parking brake operating device according to claim 1, wherein said end wall on the handle side of said sleeve is formed separately from said sleeve and connected with said sleeve by a connecting member; the inner diameter of said sleeve is larger than the outer diameter of said plunger; a cylindrical protector is disposed between the outer diameter of one end of said plunger and the inner diameter of said sleeve; said plunger, sleeve and protector are connected with a pin penetrating the same in the diametrical direction of said plunger; said handle is composed of said shaft member consisting of two members connected to each other, a core bar which is fixed substantially vertically to said shaft member and a grip portion which surrounds the whole periphery of said core bar and the portion on the core bar side of said shaft member; and said cam surfaces are formed on said end wall on the handle side of said sleeve and said expanded portion of said shaft member.

10. A parking brake operating device according to claim 1, wherein said end wall on the handle side of said sleeve is formed separately from said sleeve and connected with said sleeve by a connecting member; the inner diameter of said sleeve is larger than the outer diameter of said plunger; a cylindrical protector is disposed between the outer diameter of one end of said plunger and the inner diameter of said sleeve; said plunger, sleeve and protector are connected with a pin penetrating the same in the diametrical direction of said plunger; a cam member which is fixed inside said end wall on the handle side of said sleeve such as to prevent form rotation of said cam member in relation to said sleeve, said handle is composed of said shaft member, a core bar which is fixed substantially vertically to said shaft member and a grip portion which surrounds the whole periphery of said core bar and the portion on the core bar side of said shaft member; and said cam surfaces are formed on said end wall on the handle side of said sleeve and said expanded portion of said shaft member.

11. A parking brake operating device according to claim 1, wherein each of said cam surfaces has a pair of projections and a pair of depressions each of which are disposed at an angular position of 180 degrees.

* * * * *